(12) United States Patent
Lail et al.

(10) Patent No.: US 7,236,670 B2
(45) Date of Patent: Jun. 26, 2007

(54) OPTICAL TUBE ASSEMBLY HAVING A DRY INSERT AND METHODS OF MAKING THE SAME

(75) Inventors: Jason C. Lail, Conover, NC (US); David W. Chiasson, Hickory, NC (US); Jody L. Greenwood, Hickory, NC (US); David A. Seddon, Hickory, NC (US); Thomas Ottmann, Neustadt (DE)

(73) Assignee: Corning Cable Systems, LLC., Hickory, NC (US)

( * ) Notice: Subject to any disclaimer, the term of this patent is extended or adjusted under 35 U.S.C. 154(b) by 0 days.

(21) Appl. No.: 11/224,456

(22) Filed: Sep. 12, 2005

(65) Prior Publication Data

US 2006/0002668 A1    Jan. 5, 2006

Related U.S. Application Data

(63) Continuation of application No. 10/326,022, filed on Dec. 19, 2002, now Pat. No. 6,970,629.

(51) Int. Cl.
*G02B 6/44* (2006.01)

(52) U.S. Cl. ..................... 385/100; 385/102

(58) Field of Classification Search .......... 385/100, 385/102, 108, 109, 106
See application file for complete search history.

(56) References Cited

U.S. PATENT DOCUMENTS

| | | | |
|---|---|---|---|
| 4,078,853 A | 3/1978 | Kempf et al. | 350/96.23 |
| 4,226,504 A | 10/1980 | Bellino | 350/96.23 |
| 4,420,220 A | 12/1983 | Dean et al. | 350/96.23 |
| 4,701,015 A | 10/1987 | Saito et al. | 350/96.23 |
| 4,705,571 A | 11/1987 | Lange et al. | 106/287 |
| 4,707,569 A | 11/1987 | Yoshimura et al. | 174/116 |
| 4,725,628 A | 2/1988 | Garvey et al. | 521/137 |
| 4,725,629 A | 2/1988 | Garvey et al. | 521/137 |
| 4,815,813 A | 3/1989 | Arroyo et al. | 350/96.23 |
| 4,818,060 A | 4/1989 | Arroyo | 350/96.23 |
| 4,909,592 A | 3/1990 | Arroyo et al. | 350/96.23 |
| 4,913,517 A | 4/1990 | Arroyo et al. | 350/96.23 |
| 4,979,795 A | 12/1990 | Mascarenhas | 350/96.23 |

(Continued)

FOREIGN PATENT DOCUMENTS

DE    2434280 A1    7/1974

(Continued)

OTHER PUBLICATIONS

Norris, R. H.; Weimann, P.A., "Dry Central Tube Ribbon Cables for Outside Plant Environment", Proc. of the 51st Intern. Wire & Cable Symposium p. 202-210 (Nov. 2002).

(Continued)

*Primary Examiner*—Hae Moon Hyeon (57) ABSTRACT

An optical tube assembly and methods of manufacturing the same include a tube, at least one optical waveguide, and a dry insert. In one embodiment, the dry insert generally surrounds the at least one optical waveguide and forms a core that is disposed within the tube. In one embodiment, the dry insert is compressed at least about 10 percent for coupling the at least optical waveguide to the interior surface of the tube.

26 Claims, 6 Drawing Sheets

U.S. PATENT DOCUMENTS

| | | | |
|---|---|---|---|
| 5,016,952 A | 5/1991 | Arroyo et al. | 350/96.2 |
| 5,054,880 A | 10/1991 | Bruggendieck | 385/111 |
| 5,109,456 A | 4/1992 | Sano et al. | 385/100 |
| 5,125,063 A | 6/1992 | Panuska et al. | 385/113 |
| 5,133,034 A | 7/1992 | Arroyo et al. | 385/107 |
| 5,224,190 A | 6/1993 | Chu et al. | 385/107 |
| 5,243,675 A | 9/1993 | Kathiresan et al. | 385/109 |
| 5,377,290 A | 12/1994 | Ohta et al. | 385/100 |
| 5,422,973 A | 6/1995 | Ferguson et al. | 385/112 |
| 5,509,097 A | 4/1996 | Tondi-Resta et al. | 385/113 |
| 5,621,841 A | 4/1997 | Field | 385/113 |
| 5,621,842 A | 4/1997 | Keller | 385/114 |
| 5,630,003 A | 5/1997 | Arroyo | 385/113 |
| 5,668,912 A | 9/1997 | Keller | 385/100 |
| 5,684,904 A | 11/1997 | Bringuier et al. | 385/109 |
| 5,689,601 A | 11/1997 | Hager et al. | 385/109 |
| 5,698,615 A | 12/1997 | Polle | 523/173 |
| 5,763,067 A | 6/1998 | Bruggemann et al. | 428/317.9 |
| 5,838,863 A | 11/1998 | Fujiura et al. | 385/109 |
| 6,087,000 A | 7/2000 | Girgis et al. | 428/392 |
| 6,091,871 A | 7/2000 | Elisson et al. | 385/113 |
| 6,122,424 A | 9/2000 | Bringuier | 385/100 |
| 6,178,278 B1 | 1/2001 | Keller et al. | 385/109 |
| 6,226,431 B1 | 5/2001 | Brown et al. | 385/114 |
| 6,229,944 B1 | 5/2001 | Yokokawa et al. | 385/114 |
| 6,278,826 B1 | 8/2001 | Sheu | 385/109 |
| 6,314,224 B1 | 11/2001 | Stevens et al. | 385/113 |
| 6,321,012 B1 | 11/2001 | Shen | 385/106 |
| 6,377,738 B1 | 4/2002 | Anderson et al. | 385/113 |
| 6,389,204 B1 | 5/2002 | Hurley | 385/102 |
| 6,463,199 B1 | 10/2002 | Quinn et al. | 385/109 |
| 6,504,979 B1 | 1/2003 | Norris et al. | 385/109 |
| 6,574,400 B1 | 6/2003 | Lail | 385/109 |
| 6,586,094 B1 | 7/2003 | Rebouillat et al. | 428/372 |
| 6,618,526 B2 | 9/2003 | Jackman et al. | 385/102 |
| 6,654,527 B2 | 11/2003 | Sakabe et al. | 385/114 |
| 6,711,392 B1 | 3/2004 | Zelesnik | 385/100 |
| 6,714,708 B2 | 3/2004 | McAlpine et al. | 385/110 |
| 6,728,451 B2 | 4/2004 | Kordahi | 385/100 |
| 6,749,446 B2 | 6/2004 | Nechitailo | 439/114 |
| 6,847,768 B2 | 1/2005 | Lail et al. | 385/111 |
| 2002/0009272 A1 | 1/2002 | Parris | |
| 2003/0044137 A1 | 3/2003 | Lopez | |
| 2003/0068147 A1 | 4/2003 | Nechitailo | |
| 2004/0156603 A1* | 8/2004 | Schneider et al. | 385/102 |

FOREIGN PATENT DOCUMENTS

| | | |
|---|---|---|
| DE | 2445532 | 1/1976 |
| DE | 2743260 | 4/1979 |
| DE | 2944997 | 11/1979 |
| DE | 3444500 A1 | 11/1985 |
| DE | 19713063 A1 | 10/1998 |
| DE | 10129772 A1 | 1/2003 |
| EP | 0022036 A1 | 1/1981 |
| EP | 0577233 A1 | 1/1994 |
| EP | 0916980 A1 | 5/1999 |
| EP | 1087247 A2 | 4/2000 |
| EP | 1065545 A1 | 1/2001 |
| EP | 1170614 A1 | 1/2002 |
| EP | 1302796 A1 | 4/2003 |
| GB | 2159291 A | 11/1982 |
| GB | 2189071 A | 10/1987 |
| JP | 60-087307 | 5/1985 |
| JP | 61-023104 | 1/1986 |
| JP | 9-152535 | 6/1997 |
| JP | 11-271581 | 10/1999 |
| JP | 11-337783 | 12/1999 |
| JP | 2001-343565 | 12/2001 |
| JP | 2001-343566 | 12/2001 |
| JP | 2002-236241 | 8/2002 |
| WO | 02/099491 A1 | 12/2002 |

OTHER PUBLICATIONS

Van Vickle, P., et al., "Innovative Dry Buffer Tube Design for Central Tube Ribbon Cable", Proc. of the 2001 National Fiber Optics Engineers Conference, p. 154-161 (2001).

Taylor, C., et al., "Effect of Water Blocking Materials on Moisture Diffusion in Prototype Cable Structures", Proc. of the 50th Intern. Wire & Cable Symposium, p. 518-525 (Nov. 12, 2001).

Dixon, L., et al., "Crush and Bending Resistance in Next Generation Cable Designs", Proc. of the 50th Intern. Wire & Cable Symposium, p. 422-431 (Nov. 12, 2001).

Wagman R., et al, "BOTDR Analysis of Cable Tensile Testing", Proc. of the 48th Intern. Wire & Cable Symposium, p. 658-664 (Nov. 15, 1999).

Beasley, B., "Look Mom! No Gel!" Outside Plant Magazine, Dec. 2002, p. 16-18.

Geca-Tapes, Non-Woven Wrapping-Tapes Catalog "Foam Tapes", Apr. 1996.

Geca-Tapes, Waterblocking Tapes Catalog—"Waterblocking Foam Tapes", Apr. 1996.

Dow Plastics, "Resin for Pipe Extrusion and Pipe Fittings", May 2001.

Chung, Su-Vun, "Macrobend Loss of 1300nm Optimized Single Mode Fibre" at 1550 nm, Intern. Wire & Cable Symposium Prcoeedings (Nov. 1998) p. 704-709.

Okada et al., Proceedings of the 49th International Wire and Cable Symposium "Development of New Dry Tube with Water Blocking Laminated Tape", Nov. 2000.

* cited by examiner

GREASE (PRIOR ART)
Fig. 11

WATER-SWELLABLE TAPE (PRIOR ART)
Fig. 12

OPTICAL TUBE ASSEMBLY HAVING A DRY INSERT AND METHODS OF MAKING THE SAME

RELATED APPLICATIONS

The present application is a Continuation of U.S. Ser. No. 10/326,022 filed on Dec. 19, 2002 now U.S. Pat. No. 6,970,629, which is incorporated herein by reference.

FIELD OF THE INVENTION

The present invention relates generally to dry packaging of optical waveguides. More specifically, the invention relates to an optical tube assembly that includes at least one dry insert for protecting at least one optical waveguide.

BACKGROUND OF THE INVENTION

Fiber optic cables include optical waveguides such as optical fibers that transmit optical signals, for example, voice, video, and/or data information. One type of fiber optic cable configuration includes an optical waveguide disposed within a tube, thereby forming a tube assembly. Generally speaking, the tube protects the optical waveguide; however, the optical waveguide must be further protected within the tube. For instance, the optical waveguide should have some relative movement between the optical waveguide and the tube to accommodate bending. On the other hand, the optical waveguide should be adequately coupled with the tube, thereby inhibiting the optical waveguide from being displaced within the tube when, for example, pulling forces are applied to install the cable. Additionally, the tube assembly should inhibit the migration of water therein. Moreover, the tube assembly should be able to operate over a range of temperatures without undue optical performance degradation.

Conventional optical tube assemblies meet these requirements by filling the tube with a thixotropic material such as grease. Thixotropic materials generally allow for adequate movement between the optical waveguide and the tube, cushioning, and coupling of the optical waveguide. Additionally, thixotropic materials are effective for blocking the migration of water within the tube. However, the thixotropic material must be cleaned from the optical waveguide before connectorization of the same. Cleaning the thixotropic material from the optical waveguide is a messy and time-consuming process. Moreover, the viscosity of thixotropic materials is generally temperature dependent. Due to changing viscosity, the thixotropic materials can drip from an end of the tube at relatively high temperatures and the thixotropic materials may cause optical attenuation at relatively low temperatures.

Cable designs have attempted to eliminate thixotropic materials from the tube, but the designs are generally inadequate because they do not meet all of the requirements and/or are expensive to manufacture. One example that eliminates the thixotropic material from the tube is U.S. Pat. No. 4,909,592, which discloses a tube having water-swellable tapes and/or yarns disposed therein. This design requires a large number of water-swellable components within the tube to adequately couple optical fibers to the tube. The use of large numbers of water-swellable components is not economical because it increases the cost of the cable. Another example that eliminates the thixotropic material is U.S. Pat. No. 6,278,826, which discloses a foam having a moisture content greater than zero that is loaded with super-absorbent polymers. The moisture content of the foam is described as improving the flame-retardant characteristics of the foam. Likewise, the foam of this design is relatively expensive and increases the cost of the cable.

SUMMARY OF THE INVENTION

The present invention is directed to an optical tube assembly including a tube having an interior surface, at least one optical waveguide disposed within the tube, and at least one dry insert. The dry insert being disposed within the tube and generally surrounding the at least one optical waveguide. The dry insert is compressed at least about 10 percent for adequately coupling the at least one optical waveguide to the interior surface of the tube. Moreover, optical cables according to the present invention can include one, or more, optical tube assemblies as described herein.

The present invention is also directed to an optical tube assembly including a tube having an interior surface, at least one optical waveguide, and at least one dry insert. The at least one dry insert having at least two laminated layers that generally surround the at least one optical waveguide, thereby forming a core that is disposed within the tube. The at least one dry insert is capable of adequately coupling the at least one optical waveguide to the interior surface of the tube while cushioning the at least one optical waveguide, thereby maintaining an optical attenuation below about 0.3 dB/km at a reference wavelength of 1550 nm.

The present invention is further directed to an optical tube assembly including a tube having an interior surface, at least one optical waveguide, and at least one dry insert. The at least one dry insert and the at least one optical waveguide forming a core disposed within the tube, wherein the at least one optical waveguide has a normalized pull-out force between about 0.5 N/m and about 5.0 N/m.

Additionally, the present invention is directed to a method of manufacturing an optical tube assembly including the steps of paying off at least one optical waveguide. Placing a dry insert adjacent to the at least one waveguide, thereby forming a core. Extruding a tube around the core so that the core has a normalized pullout force between about 0.5 N/m and about 5.0 N/m.

BRIEF DESCRIPTION OF THE FIGS.

FIG. 5 is a cross-sectional view of a fiber optic cable according to one embodiment of the present invention.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
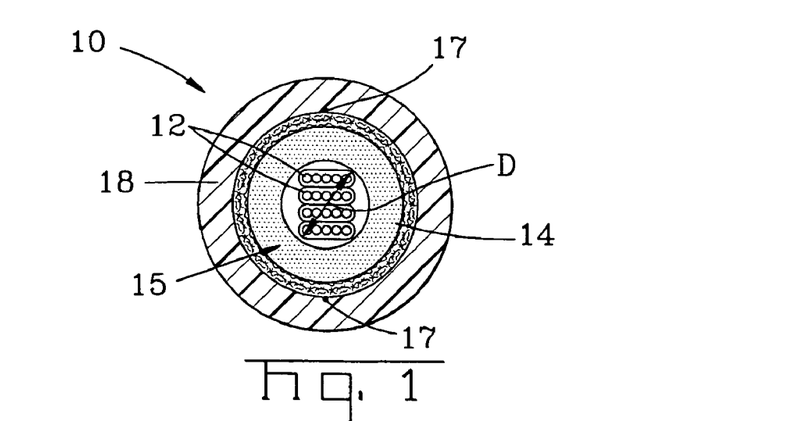
FIG. 1 is a cross-sectional view of a tube assembly according to the present invention.

Illustrated in FIG. 1 is an exemplary tube assembly 10 according to one aspect of the present invention. Tube assembly 10 includes at least one optical waveguide 12, at least one dry insert 14, and a tube 18. In this case, the at least one optical waveguide 12 is in the form of a stack of ribbons having a diagonal D dimension across the corners of the stack. Dry insert 14 generally surrounds the at least one optical waveguide 12 and forms core 15, which is disposed within tube 18. Dry insert 14 performs functions such as cushioning, coupling, inhibiting the migration of water, and accommodates bending. Dry insert 14 is advantageous because the optical waveguides are easily removed therefrom without leaving a residue or film that requires cleaning before connectorization. Moreover, unlike conventional thixotropic materials, dry insert 14 does not change viscosity with temperature variations or have a propensity to drip from an end of the tube at high temperatures. Furthermore, tube assembly 10 can include other suitable components such as a polyester binder thread 17 to hold dry insert 14 about optical waveguide 12. Additionally, tube assembly 10 can be a portion of cable as shown in FIG. 5.

As depicted, optical waveguide 12 is an optical fiber that forms a portion of an optical fiber ribbon. In this case, the optical waveguides are a plurality of single-mode optical fibers in a ribbon format that form a portion of a ribbon stack. The ribbon stack can include helical or S-Z stranding. Additionally, other types or configurations of optical waveguides can be used. For example, optical waveguide 12 can be multi-mode, pure-mode, erbium doped, polarization-maintaining fiber, other suitable types of light waveguides, and/or combinations thereof. Moreover, optical waveguide 12 can be loose or in bundles. Each optical waveguide 12 may include a silica-based core that is operative to transmit light and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. Optical waveguide 12 can also include an identifying means such as ink or other suitable indicia for identification. Suitable optical fibers are commercially available from Corning Incorporated of Corning, N.Y.

Figure 2:
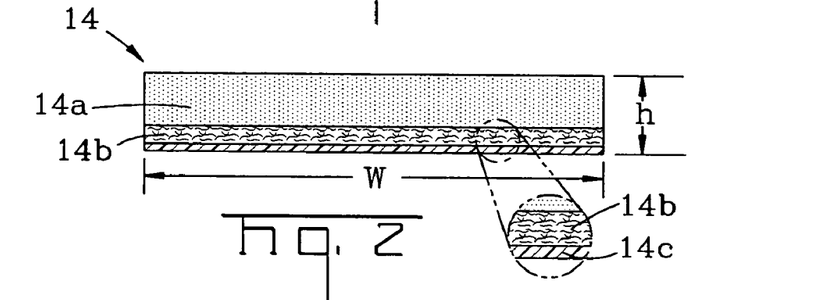
FIG. 2 is a cross-sectional view of the dry insert of the tube assembly of FIG. 1.
Figures 8, 9, 10:
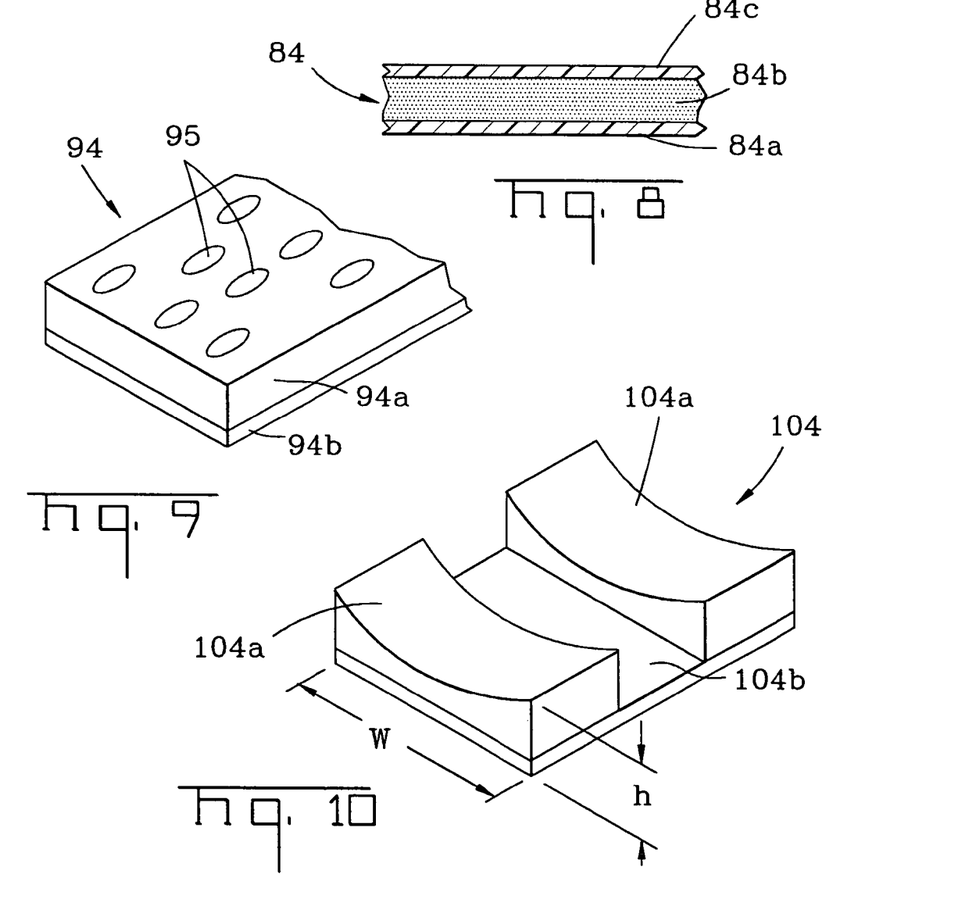
FIG. 8 is a cross-sectional view of another dry insert according to the concepts of the present invention.
FIG. 9 is a perspective view of another dry insert according to the concepts of the present invention.
FIG. 10 is a perspective view of another dry insert according to the concepts of the present invention.

FIG. 2 illustrates a cross-sectional view of dry insert 14. Dry insert 14 is formed from an elongate material or materials that are capable of being paid off from a reel for a continuous application during manufacture. Dry insert 14 is preferably formed from a plurality of layers that can perform different functions; however, the dry insert can be a single layer such as a compressible layer. Dry insert 14 cushions optical waveguide 12 from tube 18, thereby maintaining optical attenuation of optical waveguide 12 below about 0.4 dB/km at a reference wavelength of 1310 nm and 0.3 dB/km at a reference wavelengths of 1550 nm and 1625 nm. In one embodiment, dry insert 14 is formed from two distinct layers. For instance, a first layer 14a of dry insert 14 is a compressible layer and second layer 14b is a water-swellable layer. First layer 14a is formed from a compressible material having a predetermined spring constant for providing adequate coupling characteristics. By way of example, the first layer is a foam tape, preferably, an open cell foam tape; however, any suitable compressible material can be used such as a closed cell foam tape. First layer 14a may be compressed during assembly so that it provides a predetermined normal force that inhibits optical waveguide 12 from being easily displaced longitudinally along tube 18. Dry insert 14 preferably has an uncompressed height h of about 5 mm or less for minimizing the tube diameter and/or cable diameter; however, any suitable height h can be used for dry insert 14. Additionally, height h of dry insert 14 need not be constant across the width, but can vary, thereby conforming to the cross-sectional shape of the optical waveguides and providing improved cushioning to improve optical performance (FIG. 10). Second layer 14b is a water-swellable layer such as a tape that inhibits the migration of water within tube 18.

Compression of dry insert 14 is actually a localized maximum compression of dry insert 14. In the case of FIG. 1, the localized maximum compression of dry insert 14 occurs at the corners of the ribbon stack across the diameter. Calculating the percentage of compresssion of dry insert 14 in FIG. 1 requires knowing an inner diameter of tube 18, a diagonal D dimension of the ribbon stack, and an uncompressed height h of dry insert 14. By way of example, inner diameter of tube 18 is 7.1 mm, diagonal D of the ribbon stack is 5.1 mm, and the uncompressed height h of dry insert 14 across a diameter is 3.0 mm (2 times 1.5 mm). Adding diagonal D (5.1 mm) and the uncompressed height h of dry insert 14 across the diameter (3.0 mm) yields an uncompressed dimension of 8.1 mm. When placing the ribbon stack and dry insert 14 and into tube 18 with an inner diameter of 7.1 mm, dry insert is compressed a total of 1 mm (8.1 mm−7.1 mm). Thus, dry insert 14 is compressed by about thirty percent across the diameter of tube 18.

In other embodiments, first layer 14a is uncompressed, but begins to compress if optical waveguide movement is initiated. Other variations include attaching or bonding a portion of dry insert 14 to tube 18. For example, adhesives, glues, elastomers, and/or polymers 14c are disposed on a portion of the surface of dry insert 14 that contacts tube 18 for attaching dry insert 14 to tube 18. Additionally, it is possible to helically wrap dry insert 14 about optical waveguide 12, instead of being longitudinally disposed. In still further embodiments, two or more dry inserts can be formed about optical waveguide 12 such as two halves.

Figure 3:
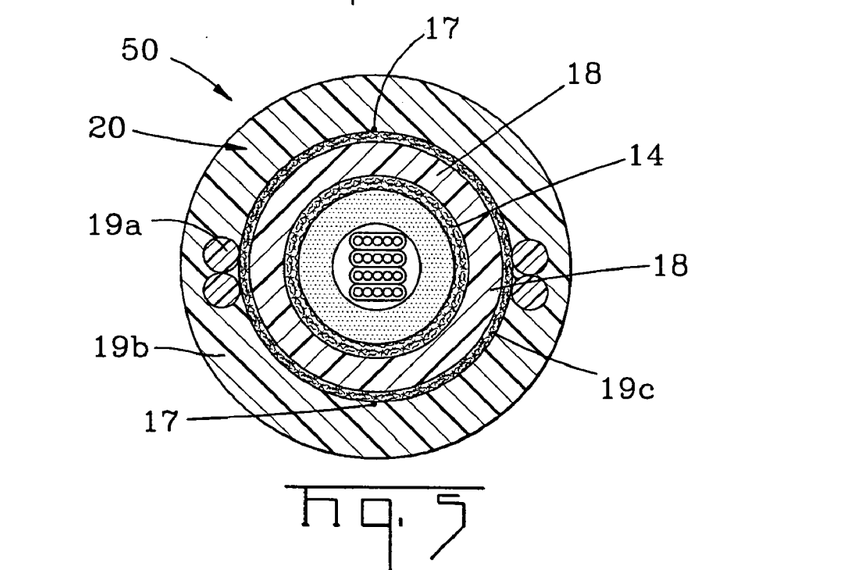
FIG. 3 is a bar graph depicting an optical ribbon pullout force for various tube configurations.
Figure 11:
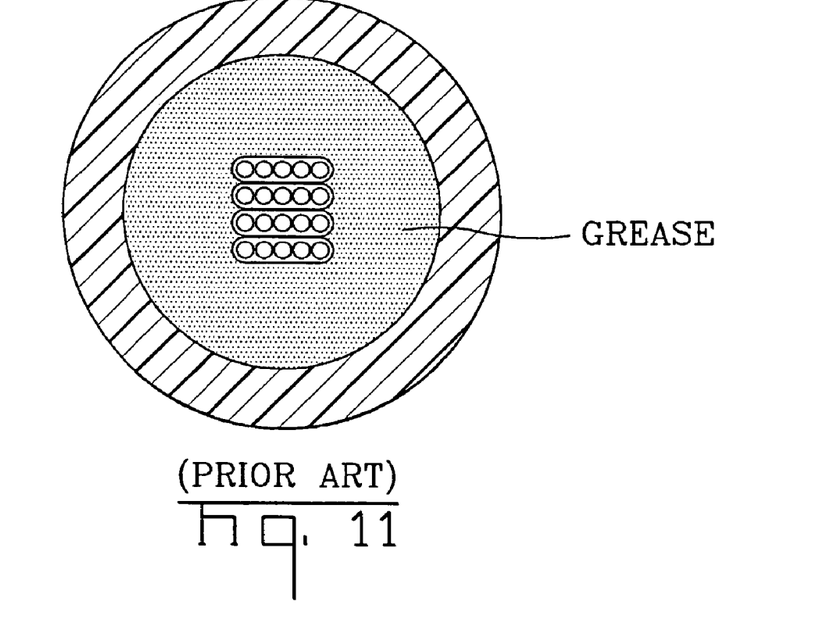
FIG. 11 is a cross-sectional view of a cable having a conventional grease filled tube assembly.
Figure 12:
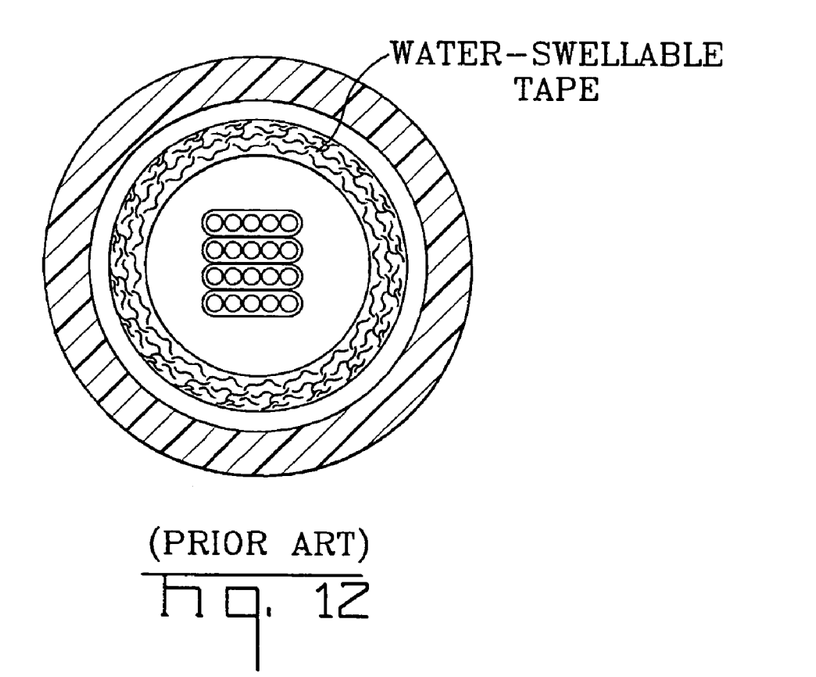
FIG. 12 is a cross-sectional view of a cable having a conventional dry tube assembly.

FIG. 3 is a bar graph depicting a normalized optical ribbon pullout force (N/m) for various tube configurations. The ribbon pullout force test measured the force required to initiate movement of a ribbon stack from a 10-meter length of cable. Specifically, the stack of ribbons were pulled from the tube and the force required to initiate movement was divided by the length of the cable, thereby normalizing the optical ribbon pullout force. As a baseline for comparison, bar 30 depicts a ribbon pullout force of about 4.8 N/m for a ribbon stack of 120-fibers in conventional grease (a thixotropic material) filled tube (FIG. 11). Bar 32 depicts a ribbon pullout force for a conventional dry tube design solely having a water-swellable tape around a ribbon stack of 144-fibers (FIG. 12), which are loosely disposed in a tube.

Specifically, bar 32 depicts a ribbon pullout force of about 0.6 N/m for the 144-fiber ribbon stack. Thus, the conventional dry tube design (FIG. 12) has a ribbon pullout force that is about twelve percent of the ribbon pullout force of the conventional grease filled tube (FIG. 11), which is inadequate for proper cable performance.

Bars 34, 36, and 38 represent tube assemblies according to the present invention. Specifically, bar 34 depicts a ribbon pullout force of a 144-fiber stack from a tube assembly 10 having dry insert 14 with an uncompressed height h of about 1.5 mm with about a zero percent compression of dry insert 14. In this embodiment, bar 34 depicts a ribbon pullout force of about 1.0 N/m, which is a surprising improvement over the conventional dry tube. Bars 36 and 38 represent configurations where dry insert 14 is compressed within tube assembly 10 by a percentage from its original height to an average compressed height. More specifically, bar 36 represents a ribbon pullout force of a similar tube assembly as bar 34, expect that in this embodiment dry insert 14 is compressed about thirty percent. In this embodiment, bar 36 depicts a ribbon pullout force of about 2.7 N/m. Bar 38 represents a ribbon pullout force of a 144-fiber ribbon stack from a tube assembly with dry insert 14 having an uncompressed height h of about 3 mm, which is compressed by about thirty percent within the tube. In this embodiment, bar 38 depicts a ribbon pullout force of about 0.5 N/m. Thus, according to the concepts of the present invention the compression of dry insert 14 is preferably in the range of about 10% to about 90%; however, other suitable ranges of compression may provide the desired performance. Nonetheless, the compression of dry insert 14 should not be so great as to cause undue optical attenuation in any of the optical waveguides. Preferably, the ribbon pullout force is in the range of about 0.5 N/m and about 5.0 N/m, more preferably, in the range of about 1 N/m to about 4 N/m.

Figure 4:
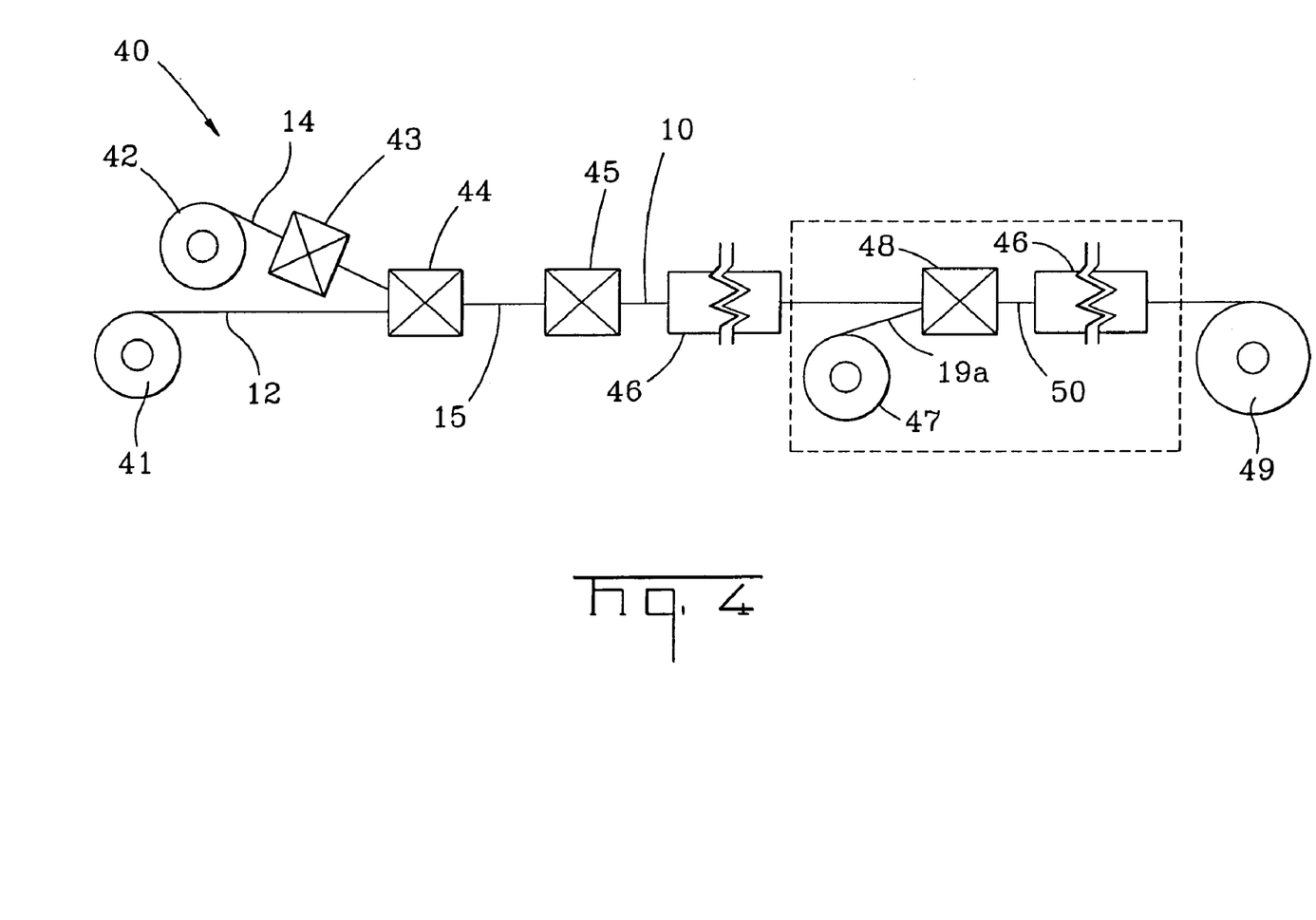
FIG. 4 is a schematic representation of a manufacturing line according to the present invention.

FIG. 4 schematically illustrates an exemplary manufacturing line 40 for tube assembly 10 according to the present invention. Manufacturing line 40 includes at least one optical waveguide payoff reel 41, a dry insert payoff reel 42, a compression station 43, a binding station 44, a cross-head extruder 45, a water trough 46, and a take-up reel 49. Additionally, tube assembly 10 may have a sheath 20 therearound, thereby forming a cable 50 as illustrated in FIG. 5. Sheath 20 can include strength members 19*a* and a jacket 19*b*, which can be manufactured on the same line as tube assembly 10 or on a second manufacturing line. The exemplary manufacturing process includes paying-off at least one optical waveguide 12 and dry insert 14 from respective reels 41 and 42. Only one payoff reel for optical waveguide 12 and dry insert 14 are shown for clarity; however, the manufacturing line can include any suitable number of payoff reels to manufacture tube assemblies and cables according to the present invention. Next, dry insert 14 is compressed to a predetermined height h at compression station 43 and generally positioned around optical waveguide 12, then binding station wraps a binding thread around dry insert 14, thereby forming core 15. Thereafter, core 15 is feed into cross-head extruder 45 where tube 18 is extruded about core 15, thereby forming tube assembly 10. Tube 18 is then quenched in water trough 46 and then tube assembly 10 is wound onto take-up reel 49. As depicted in the dashed box, if one manufacturing line is set-up to make cable 50, then strength members 19*a* are paid-off reel 47 and positioned adjacent to tube 18, and jacket 19*b* is extruded about strength members 19*a* and tube 18 using cross-head extruder 48. Thereafter, cable 50 passes into a second water trough 46 before being wound-up on take-up reel 49. Additionally, other cables and/or manufacturing lines according to the concepts of the present invention are possible. For instance, cables and/or manufacturing lines may include a water-swellable tape 19*c* and/or an armor between tube 18 and strength members 19*a*; however, the use of other suitable cable components are possible.

Figure 6:
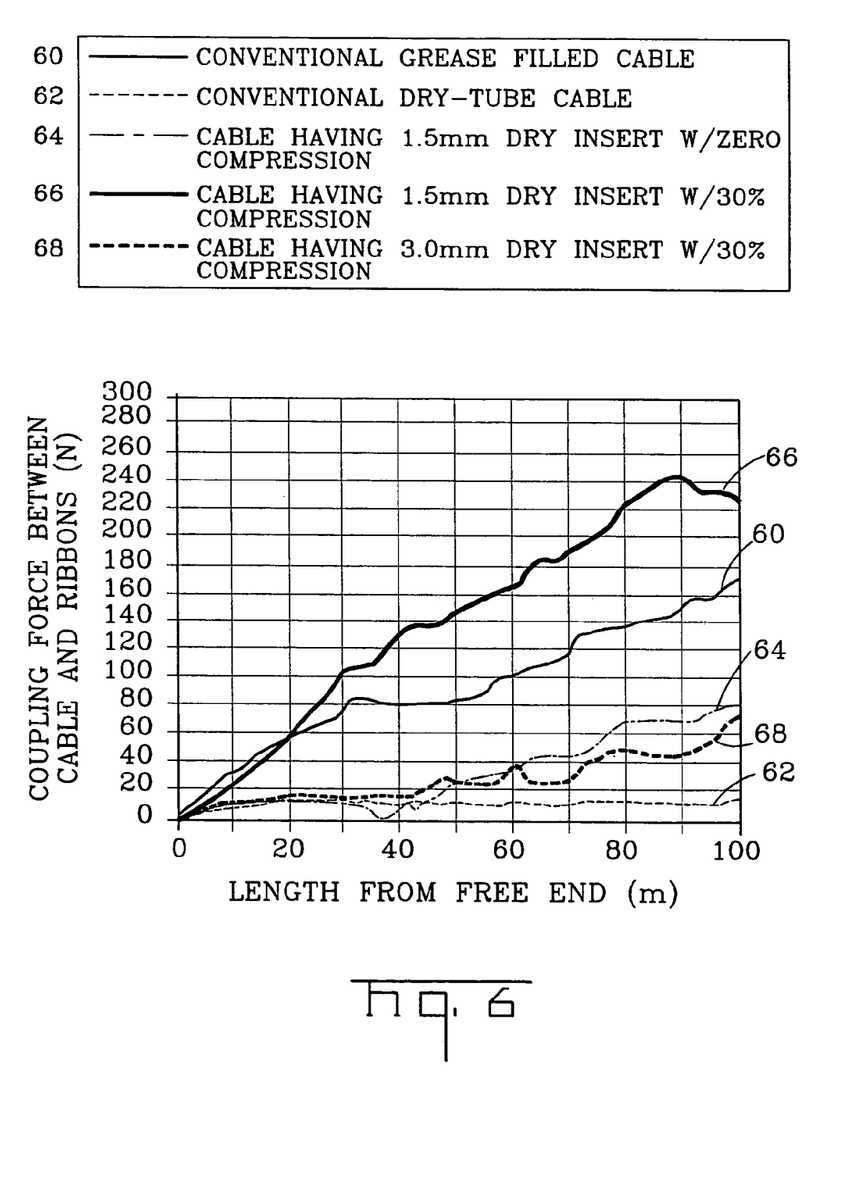
FIG. 6 is a graph depicting an optical ribbon coupling force associated with various cable configurations.

FIG. 6 is a graph depicting the results of a ribbon coupling force for cables having the similar tube assemblies as used in FIG. 3. The ribbon coupling force test is used for modeling the forces applied to the optical waveguide(s) when subjecting a cable to, for example, pulling during installation of the cable. Although the results between the ribbon pullout force and the ribbon coupling force may have forces in the same general range, the ribbon coupling force is generally a better indicator of actual cable performance.

In this case, the ribbon coupling test simulates an underground cable installation in a duct by applying 600 pounds of tension on a 250 m length of cable by placing pulling sheaves on the respective sheaths of the cable ends. However, other suitable loads, lengths, and/or installation configurations can be used for characterizing ribbon coupling in other simulations. Then, the force on the optical waveguide (s) along its length is measured from the end of cable. The force on the optical waveguide(s) is measured using a Brillouin Optical Time-Domain Reflectometer (BOTDR). Determining a best-fit slope of the curve normalizes the ribbon coupling force.

As a baseline for comparison, curve 60 depicts a normalized ribbon coupling force of about 1.75 N/m for a cable having a ribbon stack of 120-fibers in conventional grease filled cable (FIG. 11). Curve 62 depicts a ribbon pullout force for a cable having a conventional dry tube design having a water-swellable tape around a ribbon stack of 144-fibers (FIG. 12), which are loosely disposed in a tube. Specifically, curve 62 depicts a normalized ribbon coupling force of about 0.15 N/m for the 144-fiber ribbon stack. Thus, the conventional dry tube design (FIG. 12) has a normalized ribbon coupling force that is about nine percent of the normalized ribbon coupling force of the conventional grease filled tube (FIG. 11), which is inadequate for proper cable performance. In other words, the ribbon stack of the conventional dry tube cable is easily displacable during stretching of the cable sheath, for example, during aerial ice loading, aerial galloping, cable dig-ups, and pulling during installation of the cable.

Curves 64, 66, and 68 represent cables according to the present invention. Specifically, curve 64 depicts a ribbon coupling force of a cable having a 144-fiber stack with a tube assembly 10 having dry insert 14 with an uncompressed height h of about 1.5 mm with about a zero percent compression of dry insert 14. In this embodiment, curve 64 depicts a ribbon coupling force of about 0.80 N/m, which is an improvement over the conventional dry cable of FIG. 12. Curves 66 and 68 represent cable configurations where dry insert 14 is compressed within tube assembly 10 by a percentage from its original height to an average compressed height. More specifically, curve 66 represents a ribbon coupling force of a similar cable as curve 64, expect that in this embodiment dry insert 14 is compressed about thirty percent. In this embodiment, curve 66 depicts a ribbon coupling force of about 2.80 N/m. Curve 68 represents a ribbon coupling force of a cable having a 144-fiber ribbon stack from a cable having a tube assembly with dry insert 14 having an uncompressed height h of about 3 mm, which is compressed by about thirty percent within the tube. In this embodiment, curve 68 depicts a ribbon coupling force of about 0.75 N/m. Thus, according to the concepts of the present invention the ribbon coupling force is preferably in the range of about 0.5 N/m to about 5.0 N/m, more preferably, in the range of about 1 N/m to about 4 N/m. However, other suitable ranges of ribbon coupling force may provide the desired performance.

Figure 7:
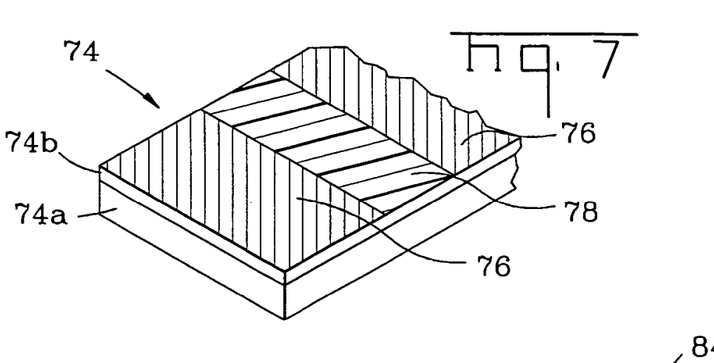
FIG. 7 is a perspective view of another dry insert according to the concepts of the present invention.

Additionally, the concepts of the present invention can be employed with other configurations of the dry insert. As depicted in FIG. 7, dry insert 74 has a first layer 74a and a second layer 74b that includes different suitable types of water-swellable substances. In one embodiment, two different water-swellable substances are disposed in, or on, second layer 14b so that tube assembly 10 is useful for multiple environments and/or has improved water-blocking performance. For instance, second layer 14b can include a first water-swellable component 76 effective for ionized liquids such as saltwater and a second water-swellable component 78 effective for non-ionized liquids. By way of example, first water-swellable material is a polyacrylamide and second water-swellable material is a polyacrylate superabsorbent. Moreover, first and second water-swellable components 76,78 can occupy predetermined sections of the water-swellable tape. By alternating the water-swellable materials, the tape is useful for either standard applications, salt-water applications, or both. Other variations of different water-swellable substances include having a water-swellable substance with different swell speeds, gel strengths and/or adhesion with the tape.

FIG. 8 depicts another embodiment of the dry insert. Dry insert 84 is formed from three layers. Layers 84a and 84c are water-swellable layers that sandwich a layer 84b that is compressible for providing a coupling force to the at least one optical waveguide. Likewise, other embodiments of the dry insert can include other variations such at least two compressible layers sandwiching a water-swellable layer. The two compressible layers can have different spring constants for tailoring the normal applied to the at least optical waveguide.

FIG. 9 illustrates a dry insert 94 having layers 94a and 94b according to another embodiment of the present invention. Layer 94a is formed from a closed-cell foam having at least one perforation 95 therethrough and layer 94b includes at least one water-swellable substance; however, other suitable materials can be used for the compressible layer. The closed-cell foam acts as a passive water-blocking material that inhibits water from migrating therealong and perforation 95 allows an activated water-swellable substance of layer 94b to migrate radially inward towards the optical waveguide. Any suitable size, shape, and/or pattern of perforation 95 that allows the activated water-swellable substance to migrate radially inward to effectively block water is permissible. The size, shape, and/or pattern of perforations can be selected and arranged about the corner optical waveguides of the stack, thereby improving corner optical waveguide performance. For example, perforations 95 can provide variation in dry insert compressibility, thereby tailoring the normal force on the optical waveguides for maintaining optical performance.

FIG. 10 depicts dry insert 104, which illustrates other concepts of the present invention. Dry insert 104 includes layers 104a and 104b. Layer 104a is formed of a plurality of non-continuous compressible elements that are disposed on layer 104b, which is a continuous water-swellable layer. In one embodiment, the elements of layer 104a are disposed at regular intervals that generally correlate with the lay length of a ribbon stack. Additionally, the elements have a height h that varies across their width w. Stated another way, the elements are shaped to conform to the shape of the optical waveguides they are intended to generally surround.

Many modifications and other embodiments of the present invention, within the scope of the appended claims, will become apparent to a skilled artisan. For example, optical waveguides can be formed in a variety of ribbon stacks or configurations such as a stepped profile of the ribbon stack. Cables according to the present invention can also include more than one optical tube assembly stranded helically or in S-Z configurations. Additionally, dry inserts of the present invention can be laminated together as shown or applied as individual components. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations. For instance, dry inserts of the present invention are suitable for use in tubeless cables with a sheath therearound.

The invention claimed is:

1. An optical tube assembly comprising:
   a tube, the tube having an inner surface;
   at least one optical fiber, the at least one optical fiber being disposed within the tube;
   at least one dry insert, the at least one dry insert comprising two individual components, the two individual components being a compressible layer that is formed as an elongate tape and a water-swellable component, the at least one dry insert being disposed within the tube and generally disposed about the at least one optical fiber, wherein the at least one dry insert acts to couple the at least one optical fiber with the tube.

2. The optical tube assembly of claim 1, the compressible layer being a foam layer.

3. The optical tube assembly of claim 1, the at least one optical fiber being a portion of an optical fiber ribbon.

4. The optical tube assembly of claim 3, the compressible layer generally contacting a portion of the at least one optical fiber ribbon.

5. The optical tube assembly of claim 1, the at least one dry insert having an uncompressed height of about 5 millimeters or less.

6. The optical tube assembly of claim 1, wherein the at least one dry insert cushions the at least one optical fiber, thereby maintaining an optical attenuation below about 0.4 dB/km at a reference wavelength of 1310 nanometers.

7. The optical tube assembly of claim 1, the at least one dry insert being formed from more than two individual components.

8. The optical tube assembly of claim 1, the optical tube assembly being a portion of a fiber optic cable.

9. The optical tube assembly of claim 1, the optical tube assembly being a portion of a fiber optic cable that includes a strength member.

10. The optical tube assembly of claim 1, the at least one optical waveguide having a normalized pull-out force between about 0.5 N/m and about 5.0 N/m.

11. An optical tube assembly comprising:
    a tube;
    at least one optical fiber ribbon, the at least one optical fiber ribbon being disposed within the tube;
    at least one dry insert, the at least one dry insert comprising two individual components, the two individual components including a compressible layer that is an elongate tape and a water-swellable component, the at least one dry insert being disposed within the tube and generally disposed about the at least one optical fiber ribbon so that the compressible layer generally contacts a portion of the at least one optical fiber ribbon.

12. The optical tube assembly of claim 11, the compressible layer being a foam.

13. The optical tube assembly of claim 11, further comprising a plurality of optical fiber ribbons within the tube.

14. The optical tube assembly of claim 11, the at least one dry insert having an uncompressed height of about 5 millimeters or less.

15. The optical tube assembly of claim 11, wherein the at least one dry insert acts to couple the at least one optical fiber ribbon with the tube while cushioning the at least one optical fiber ribbon, thereby maintaining an optical attenuation below about 0.4 dB/km at a reference wavelength of 1310 nanometers.

16. The optical tube assembly of claim 11, wherein the compressible layer is an open cell foam and the water-swellable component generally faces an inner surface of the tube.

17. The optical tube assembly of claim 11, the at least one dry insert being formed from more than two components.

18. The optical tube assembly of claim 11, the optical tube assembly being a portion of a fiber optic cable.

19. The optical tube assembly of claim 11, the at least one optical fiber ribbon having a normalized ribbon coupling force between about 0.5 N/m and about 5.0 N/m.

20. The optical tube assembly of claim 11, the optical tube assembly being a portion of a fiber optic cable that includes a strength member.

21. A method of manufacturing an optical tube assembly comprising the steps of:

paying off at least one optical waveguide;

paying off at least one dry insert, the dry insert comprising two or more individual components, the two or more individual components being a compressible layer and at least one water-swellable component; and placing the at least one dry insert adjacent to the at least one optical waveguide so that the compressible layer faces the at least one optical waveguide, thereby forming a core; and extruding a tube around the core.

22. The method of claim 21, wherein the at least one optical waveguide is a portion of an optical fiber ribbon and the compressible layer generally contacts a portion of the optical fiber ribbon.

23. The method of claim 21, wherein the step of paying off at least one optical waveguide comprises paying off a plurality of optical fiber ribbons and forming a ribbon stack.

24. The method of claim 21, further comprising the steps of placing at least one strength member adjacent to the tube and extruding a jacket therearound, thereby forming a fiber optic cable.

25. The method of claim 21, wherein the at least one optical waveguide has a normalized pullout force between about 0.5 N/m and about 5.0 N/m.

26. The method of claim 21, further including the step of paying off a strength member, thereby forming a portion of the optical tube assembly.

* * * * *